Patented July 20, 1926.

1,593,017

UNITED STATES PATENT OFFICE.

HARRY O. CHUTE, OF NEW YORK, N. Y.

VULCANIZATION OF RUBBER.

No Drawing.  Application filed December 21, 1922. Serial No. 608,355.

This invention relates to the vulcanization of rubber; and it comprises a method of vulcanizing rubber with sulfur wherein such vulcanization is performed in the presence of a material containing the cyanamid group; all as more fully hereinafter set forth and as claimed.

In the vulcanization of rubber with elemental sulfur or its equivalents, such as selenium, etc., by heating the rubber-sulfur mixture above the melting point of sulfur, it has always been known that such metallic bases as zinc oxid, lead oxid, lime and magnesia (and some others) were accelerators of vulcanization and such bases were customarily added to nearly all rubber stocks before vulcanization.

About the time of the advent of plantation rubber, many nitrogenous basic organic compounds, such as the amines and their derivatives, were found to be accelerators and their use is now common.

I have found that vulcanization can be materially accelerated with certain organic bodies belonging to quite another class, those containing the characteristic carbonnitrogen group of calcium cyanamid. Calcium cyanamid or "lime nitrogen" occurs in commerce, being marketed mostly as a fertilizer, but is not particularly useful for the present purposes as it is only sluggishly reactive, a fact which is probably due to the high temperature at which the commercial material is made. But many active accelerators containing the cyanamid group can be made with the aid of this commercial "lime nitrogen" as a raw material, by separating the lime in well known ways, such as treatment with water, weak acids, such as carbonic acid, or dilute sulfuric acid, etc.

It is well known that cyanamid on standing or heating polymerizes to dicyandiamid and other polymerized compounds. The dicyandiamid can readily be produced in crystallized form as a white permanent crystal preparation.

Compositions of cyanamid with the basic oxids and carbonates which are referred to above as ordinary compounding ingredients in making vulcanized rubber articles, I find to be accelerators. The zinc compound, or "zinc cyanamid" is particularly useful.

Zinc cyanamid can be made from the solutions obtained from cyanamid by double precipitation, as by adding a soluble zinc salt, such as the sulfate, thereto. The insoluble calcium sulfate produced as a by-product may remain in the accelerator as it is not harmful. If chlorid of zinc is used, the resultant calcium chlorid must be removed. Other accelerators may be made in the same way by employing lead salts in place of zinc compounds.

The cyanamid compounds may be advantageously joined with various of the ordinary organic accelerators, such as thiocarbanilid, toluidines, dimethylamine, piperidine, and anilin. The combination of orthotoluidine and dicyandiamid makes an especially valuable vulcanization accelerator. In making this accelerator and others of its class, dicyandiamid is dissolved in a minimum quantity of water and the orthotoluidine or other amine, such as anilin or dimethylamine, added, with the addition of enough hydrochloric or other acid to promote mutual solution while heated. On cooling, crystals separate out which, when dried and ground, are used as the accelerator. The carbon bisulfid compounds of cyanamid containing the amines are active accelerators.

In vulcanizing rubber by the aid of the above accelerators, it is well to break down the raw rubber on heated rolls and if, for example, a tire tread is to be made about equal quantities of rubber and pigments, such as zinc oxid, gas black, etc., are mixed with sulfur, the amount of sulfur being from 4 to 6 per cent of the rubber. The pigments are incorporated in the rubber by continuous mixing on the rolls which may be quite warm without danger of scorching. When the pigments and other materials are thoroughly incorporated, the mass is taken from the rolls and used as a "mother batch" when it has cooled or preferably stood for several days. Then to 100 parts of mother batch, which is re-plasticized on cooler rolls, 1 part of the above accelerators is added; and if vulcanized at 45 pounds steam pressure for 1 hour, a good product is obtained. The quantity of the accelerator may vary according to the hardness of cure desired, the slowness of normal vulcanization of the rubber compound under treatment, the heat used and other factors known to the expert.

In using carbon bisulfid compounds, such as thiocarbanilid, in conjunction with the cyanamids, they may be mixed with the rubber separately, but it is better to make them in the presence of the cyanamids, as above described. Thus, dicyandiamid and an amine (anilin) may be mixed by shaking together or by shaking the anilin with carbon bisulfid and an aqueous solution of the dicyandiamid. A mutual solvent, such as alcohol, may be used in bringing the bisulfid, anilin and dicyandiamid together. The temperature of the mass must be kept down by outside cooling during mixing in most cases. The crystalline or solid product of these reactions seems to work better than the simple mixture above. The aldehyde condensation products of the amines in the presence of cyanamids may also be used. Thus, anilin, cyanamid and formaldehyde solutions may be mixed in aqueous, alcoholic or acid solution and the solid condensation products separated, purified and ground for use as an accelerator.

What I claim is:—

1. In the vulcanization of rubber, the process which comprises heating such rubber with sulfur in the presence of a body containing the characteristic carbon-nitrogen group contained in calcium cyanamid.

2. In the vulcanization of rubber, the process which comprises heating such rubber with sulfur in the presence of a body containing zinc cyanamid.

3. In the vulcanization of rubber, the process which comprises heating such rubber with sulfur in the presence of a body containing zinc cyanamid and thiocarbanilid.

4. In the vulcanization of rubber, the process which comprises heating such rubber with sulfur in the presence of a body comprising the reaction products of dicyandiamid and amine and carbon bisulfid.

5. In the vulcanization of rubber, the process which comprises heating such rubber with sulfur in the presence of a body comprising dicyandiamid and orthotoluidine.

6. Vulcanized rubber containing a cyanamid or alteration products of cyanamid produced in vulcanization.

7. In the vulcanization of rubber, the process which comprises heating such rubber with sulfur in the presence of a body containing the characteristic carbon-nitrogen group contained in calcium cyanamid and in the presence of a zinc compound.

8. A process for accelerating the vulcanization of rubber, guttapercha and other kinds of rubber, consisting in using as accelerating agent dicyandiamide.

9. A process for accelerating the vulcanization of rubber, guttapercha and other kinds of rubber, consisting in using as accelerating agent cyanamide.

10. A process for accelerating the vulcanization of rubber, guttapercha and other kinds of rubber, consisting in using as accelerating agent sulfur derivatives of cyanamide.

11. A process for accelerating the vulcanization of rubber, guttapercha and other kinds of rubber, consisting in using as accelerating agent the sulfur derivatives of dicyandiamide.

12. In the vulcanization of rubber the process which comprises heating such rubber with sulfur in the presence of a composition containing the characteristic carbon-nitrogen group of calcium cyanamid and also containing amine groups.

13. In the vulcanization of rubber the process which comprises heating such rubber with sulfur in the presence of a body comprising the reaction products of dicyanamide and an amine.

14. In the vulcanization of rubber the process which comprises vulcanizing such rubber in the presence of the reaction product of a cyanamid with an amine.

15. In the vulcanization of rubber a process which comprises vulcanizing such rubber in the presence of the reaction product of a cyanamid with orthotoluidine.

16. The process of vulcanizing rubber which comprises heating such rubber with sulfur in the presence of a reaction product of a cyanamid upon an amine in the presence of carbon bisulfid.

17. Vulcanized rubber containing a reaction product of a cyanamid and an amine.

18. Vulcanized rubber containing a reaction product of a cyanamid and orthotoluidine.

In testimony whereof, I have hereunto affixed my signature.

HARRY O. CHUTE.